United States Patent
Aizawa

(10) Patent No.: US 10,311,908 B2
(45) Date of Patent: Jun. 4, 2019

(54) MAGNETIC RECORDING MEDIUM

(71) Applicant: Sony Corporation, Tokyo (JP)

(72) Inventor: Takashi Aizawa, Miyagi (JP)

(73) Assignee: Sony Corporation, Tokyo (JP)

( * ) Notice: Subject to any disclaimer, the term of this patent is extended or adjusted under 35 U.S.C. 154(b) by 271 days.

(21) Appl. No.: 14/879,976

(22) Filed: Oct. 9, 2015

(65) Prior Publication Data

US 2016/0099018 A1     Apr. 7, 2016

Related U.S. Application Data

(63) Continuation of application No. 14/250,097, filed on Apr. 10, 2014, now abandoned.

(30) Foreign Application Priority Data

May 1, 2013   (JP) .................................. 2013-096503

(51) Int. Cl.
  G11B 5/66   (2006.01)
  G11B 5/73   (2006.01)
  G11B 5/65   (2006.01)

(52) U.S. Cl.
  CPC .................. *G11B 5/73* (2013.01); *G11B 5/65* (2013.01); *G11B 5/732* (2013.01); *G11B 5/7315* (2013.01); *G11B 5/7325* (2013.01)

(58) Field of Classification Search
  CPC ..... G11B 5/7315; G11B 5/732; G11B 5/7325; G11B 5/722; G11B 5/656; G11B 5/627; G11B 5/70621; G11B 5/70
  See application file for complete search history.

(56) References Cited

U.S. PATENT DOCUMENTS

| | | |
|---|---|---|
| 6,833,173 B1 | 12/2004 | Nishikawa et al. |
| 2003/0219630 A1 | 11/2003 | Moriwaki et al. |
| 2005/0064243 A1 | 3/2005 | Moriwaki et al. |
| 2005/0233178 A1 | 10/2005 | Sugimoto et al. |
| 2010/0323222 A1 | 12/2010 | Nakashio et al. |
| 2011/0311841 A1 | 12/2011 | Saito et al. |
| 2014/0329112 A1 | 11/2014 | Aizawa |
| 2014/0342189 A1 | 11/2014 | Tachibana et al. |
| 2014/0363700 A1 | 12/2014 | Tachibana et al. |
| 2015/0111066 A1 | 4/2015 | Terakawa et al. |

FOREIGN PATENT DOCUMENTS

| | | |
|---|---|---|
| JP | 2002-260215 A | 9/2002 |
| JP | 2005-196885 A | 7/2005 |
| JP | 2005-302204 A | 10/2005 |

(Continued)

OTHER PUBLICATIONS

No Author Listed, Maruzen Petrochemical Co. Ltd., Chemiway, Business segment & products, (http://www.chemiway.co.jp/en/product/data/hi_data01.html), retrieved Mar. 31, 2016, 3p.

(Continued)

*Primary Examiner* — Holly C Rickman
(74) *Attorney, Agent, or Firm* — Wolf, Greenfield & Sacks, P.C.

(57) ABSTRACT

A magnetic recording medium includes a flexible substrate, an amorphous seed layer, an under layer containing Ru, and a recording layer having a granular structure. The seed layer is provided between the substrate and the under layer. The under layer has a thickness in a range of 5 to 50 nm.

12 Claims, 3 Drawing Sheets

(56) References Cited

FOREIGN PATENT DOCUMENTS

| JP | 2006-286106 A | 10/2006 |
|----|---------------|---------|
| JP | 2007-164826 A | 6/2007  |
| JP | 2007-257679 A | 10/2007 |
| JP | 2008-210498 A | 9/2008  |

OTHER PUBLICATIONS

U.S. Appl. No. 12/815,678, filed Jun. 15, 2010, Nakashio et al.
U.S. Appl. No. 14/250,097, filed Apr. 10, 2014, Aizawa.
U.S. Appl. No. 14/273,694, filed May 9, 2014, Tachibana et al.
U.S. Appl. No. 14/289,762, filed May 29, 2014, Tachibana et al.
U.S. Appl. No. 14/514,518, filed Oct. 15, 2014, Terakawa et al.
U.S. Appl. No. 15/208,932, filed Jul. 13, 2016, Tachibana et al.

MAGNETIC RECORDING MEDIUM

CROSS REFERENCE TO RELATED APPLICATIONS

This is a continuation of and claims the benefit under 35 U.S.C. § 120 of U.S. patent application Ser. No. 14/250,097, titled "MAGNETIC RECORDING MEDIUM", filed Apr. 10, 2014, which claims the priority benefit of Japanese Priority Patent Application JP2013-096503 filed May 1, 2013, the entire contents of each of which are incorporated herein by reference.

BACKGROUND

The present technology relates to a magnetic recording medium including a flexible substrate.

In recent years, a coating type magnetic recording medium in which a magnetic powder is applied on a non-magnetic support has become the mainstream of magnetic recording media for data storage. In order to increase the recording capacity per one cartridge, it is necessary to improve a surface recording density using a finely pulverized magnetic powder; however, according to a currently used coating method, a thin film is difficult to form using fine grains having a diameter of 10 nm or less.

Accordingly, a magnetic recording medium has been proposed in which a film of a CoCrPt-based metal material having a high magnetic anisotropy is formed on a flexible substrate, for example, by a sputtering method, and in addition, this material is crystallized and oriented in a direction perpendicular to the surface of the substrate. As for this magnetic recording medium, it has been desired to improve the magnetic characteristics by improvement of the orientation of a magnetic recording layer, and hence, various techniques to satisfy this desire have been studied in recent years. For example, according to Japanese Unexamined Patent Application Publication No. 2005-196885, as one of the above techniques, there has been disclosed a magnetic recording medium in which an amorphous layer, a seed layer, an under layer, a magnetic layer, and a protective layer are at least sequentially laminated on a substrate. In addition, the above technique has also disclosed that the seed layer is formed from one of Ti, Cr, Mo, W, Zr, a Ti alloy, a Cr alloy, and a Zr alloy, the under layer is formed from Ru, and the magnetic layer is formed to have a granular structure.

SUMMARY

However, when the above-described magnetic recording medium is formed or is used, a crack may be generated in the above laminate film formed on the substrate in some cases. When a crack is once generated as described above, the durability and the reliability of the magnetic recording medium are degraded.

Hence, it is desirable to provide a magnetic recording medium which is able to improve magnetic characteristics and which is able to suppress crack generation.

In order to satisfy the above desire, according to an embodiment of the present technology, there is provided a magnetic recording medium including a flexible substrate, an amorphous seed layer, an under layer containing Ru, and a recording layer having a granular structure. In this magnetic recording medium, the seed layer is provided between the substrate and the under layer, and the thickness of the under layer is in a range of 5 to 50 nm.

As described above, according to an embodiment of the present technology, a magnetic recording medium which is able to improve the magnetic characteristics and which is able to suppress the crack generation can be provided.

DETAILED DESCRIPTION OF EMBODIMENTS

In the present technology, a "crack-resistant load" indicates a load measured by the following procedure. First, a magnetic recording medium according to an embodiment of the present technology is formed by cutting to have a rectangular shape with a width of 12.75 mm. Next, while one end of this rectangular magnetic recording medium is fixed, the other end thereof is pulled to apply a load to the magnetic recording medium. Next, the load is increased, and a load at which a crack is generated in a laminate film provided on a substrate surface is measured. This measured load is defined as the "crack-resistant load".

According to an embodiment of the present technology, a seed layer, an under layer, and a recording layer each may have either a single-layer structure or a multilayer structure. In order to further improve magnetic characteristics and/or recording and reproducing characteristics of the magnetic recording medium, a layer having a multilayer structure is preferably used. In consideration of production efficiency, in the multilayer structure, a double-layer structure is preferably used.

Embodiments of the present technology will be described in the following order.
1. Structure of Magnetic Recording Medium
2. Structure of Sputtering Apparatus
3. Method for Manufacturing Magnetic Recording Medium
4. Effects

[1. Structure of Magnetic Recording Medium]

Figure 1:
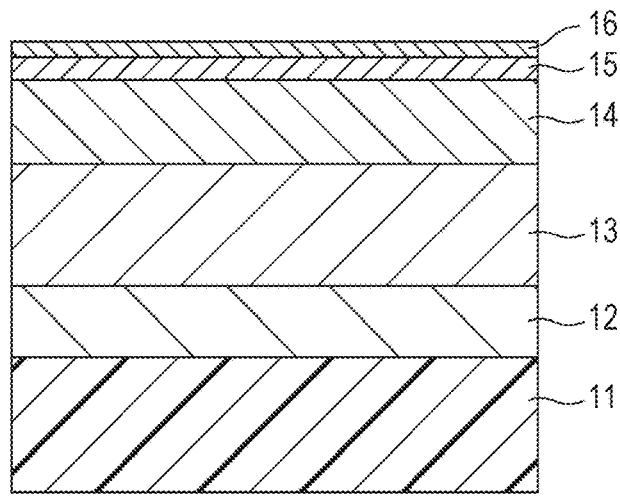
FIG. 1 is a schematic cross-sectional view showing one example of the structure of a magnetic recording medium according to an embodiment of the present technology.

FIG. 1 is a cross-sectional view schematically showing one example of the structure of a magnetic recording medium according to an embodiment of the present technology. The magnetic recording medium according to this embodiment is a so-called single-layer perpendicular magnetic recording medium, and as shown in FIG. 1, this magnetic recording medium includes a substrate 11, a seed layer 12 provided on the surface of the substrate 11, an under layer 13 provided on the surface of the seed layer 12, a magnetic recording layer 14 provided on the surface of the under layer 13, a protective layer 15 provided on the surface of the magnetic recording layer 14, and a top coat layer 16 provided on the surface of the protective layer 15. In addition, in this specification, a magnetic recording medium having no soft magnetic lining layer is called a "single-layer perpendicular magnetic recording medium", and a magnetic recording medium having a soft magnetic lining layer is called a "double-layer perpendicular magnetic recording medium".

This magnetic recording medium is suitably used as a data archive-purpose storage medium which is expected to be increasingly in demand from now on. This magnetic recording medium is able to realize 10 times or more the surface recording density of a current storage-purpose coating type magnetic recording medium, that is, to realize a surface recording density of 50 Gb/in$^2$. When a linear recording type data cartridge is formed using a magnetic recording medium having the surface recording density as described above, a large capacity recording of 50 TB or more per one data cartridge can be realized.

(Crack-Resistant Load)

The crack-resistant load of the magnetic recording medium is preferably 200 [g/12.75 mm] or more, more preferably in a range of 200 to 730 [g/12.75 mm], and even more preferably in a range of 200 to 500 [g/12.75 mm]. When the crack-resistant load is less than 200 [g/12.75 mm], at the stage on which a manufacturer forms a data cartridge using the magnetic recording medium, or at the stage on which a user uses the data cartridge thus formed, a crack is liable to be generated. When the crack is generated as described above, the durability and the reliability of the magnetic recording medium are degraded. On the other hand, when the crack-resistant load is 730 [g/12.75 mm] or less, as a material for the substrate 11, a flexible high molecular weight material which is common for the magnetic recording medium may be used.

(Substrate)

The substrate 11 is a support supporting a laminate film provided on the surface of this substrate 11. The substrate 11 is, for example, a long film. As the substrate 11, a flexible non-magnetic substrate is preferably used. As a material for the non-magnetic substrate, for example, a flexible high molecular weight material which is common for the magnetic recording medium may be used. As particular examples of the high molecular weight material as described above, for example, there may be mentioned a polyester-based resin, a polyolefin-based resin, a cellulose derivative, a vinyl-based resin, a polyimide-based resin, a polyamide-based resin, and a polycarbonate-based resin. As the polyester-based resin, for example, a copolymer or a mixture containing 10 percent by mass or more of a polyester may be used.

The Young's modulus of the substrate 11 is preferably in a range of 6,250 to 16,000 N/mm$^2$ and more preferably in a range of 6,250 to 7,000 N/mm$^2$. When the Young's modulus of the substrate 11 is 6,250 N/mm$^2$ or more, if the thickness of the under layer 13 is set to 50 nm or less as described below, the crack-resistant load can be set to 200 [g/12.75 mm] or more.

On the other hand, when the Young's modulus of the substrate 11 is set to 16,000 N/mm$^2$ or less, a flexible high molecular weight material which is common for the magnetic recording medium may be used as the material for the substrate 11. As particular examples of the flexible high molecular weight material as described above, the materials mentioned above by way of example may be mentioned. In addition, when the Young's modulus of the substrate 11 is set to 7,000 N/mm or less, among the common flexible high molecular weight materials for the magnetic recording medium, a particularly inexpensive material may be used. Hence, the cost of the magnetic recording medium may be further reduced. As the inexpensive flexible high molecular weight materials described above, for example, a polyester-based resin, a polyolefin-based resin, a cellulose derivative, a vinyl-based resin, and a polycarbonate-based resin may be mentioned.

The thickness of the substrate 11 is preferably 10.0 μm or less and more preferably in a range of 4.0 to 10.0 μm. The reason for this is that if the thickness of the substrate 11 is more than 10.0 μm, when a linear recording type data cartridge is formed using the magnetic recording medium according to this embodiment, the recording capacity is remarkably decreased.

(Seed Layer)

The seed layer 12 is provided between the substrate 11 and the under layer 13. The seed layer 12 has an amorphous state. When the seed layer 12 has a crystalline state, columnar shapes in association with the crystalline growth become apparent, and irregularities of the surface of the substrate 11 are emphasized, so that the crystalline orientation of the under layer 13 is degraded. That is, the seed layer 12 in an amorphous state has a function to reduce the irregularities of the surface of the substrate 11.

The seed layer 12 preferably includes an alloy containing Ti and Cr and preferably has an amorphous state. In this embodiment, the "seed layer" does not indicate an intermediate layer which has a crystalline structure similar to that of the under layer 13 and which is provided for the crystalline growth purpose but indicates an intermediate layer which improves the perpendicular orientation of the under layer 13 by the flatness and the amorphous state of the seed layer 12. The "alloy" indicates, for example, at least one of a solid solution, a eutectic compound, and an intermetallic compound, each of which contains Ti and Cr. The "amorphous state" indicates a state in which a halo pattern is observed by an electron diffraction method, and in which the crystalline structure is difficult to be identified.

The seed layer 12 which includes an alloy containing Ti and Cr and which has an amorphous state has a function to suppress an influence on a laminate film, such as the under layer 13, caused by an $O_2$ gas and/or $H_2O$, which is released from the inside of the substrate 11 or which is adsorbed to the surface of the substrate 11. In addition, the seed layer 12 also has functions to reduce fine irregularities of the surface of the substrate 11, to form a smooth metal surface on the surface of the substrate 11, and to improve the perpendicular orientation of the under layer 13.

The rate of O with respect to the total mass of Ti, Cr, and O (oxygen) contained in the seed layer 12 is preferably 15 atomic percent (atomic %: at %) or less and more preferably 10 at % or less. When the rate of O is more than 15 at %, since a $TiO_2$ crystal starts to grow, crystalline nucleus formation of the under layer 13 formed on the surface of the seed layer 12 is influenced, and as a result, the orientation of the under layer 13 is remarkably degraded.

The rate of Ti with respect to the total mass of Ti and Cr contained in the seed layer 12 is, for example, 10 at % or more, preferably in a range of 30 to 100 at %, and more preferably in a range of 50 to 100 at %. When the rate of Ti is less than 30 at %, since the (100) plane of the body-centered cubic lattice (bcc) structure of Cr is oriented, and as a result, the orientation of the under layer 13 formed on the surface of the seed layer 12 is degraded.

In addition, the rate of the above element can be obtained as described below. After the magnetic recording medium is ion-beam etched from a top coat layer 16 side, analysis by an Auger electron spectroscopy is performed on the outermost surface of the seed layer 12 thus etched, and the rate of the average atomic number with respect to the thickness is regarded as the rate of the element. In particular, the analysis is performed on three elements, Ti, Cr, and O, and the element amount on the percentage rate is identified.

The alloy included in the seed layer 12 may also contain at least one element other than Ti and Cr as an additive element. As this additive element, for example, there may be mentioned at least one element selected from the group consisting of Nb, Ni, Mo, Al, and W. The thickness of the seed layer 12 is, for example, in a range of 1.0 to 10.0 nm.
(Under Layer)

The under layer 13 preferably has a crystalline structure similar to that of the magnetic recording layer 14. When the magnetic recording layer 14 contains a Co-based alloy, the under layer 13 preferably contains a material having a hexagonal close-packed (hcp) structure similar to that of the Co-based alloy, and the c axis of this structure is preferably oriented in a direction perpendicular to the film surface (that is, in a film thickness direction). The reasons for this are that the orientation of the magnetic recording layer 14 can be improved, and the matching in lattice constant between the under layer 13 and the magnetic recording layer 14 can be relatively improved. As the material having a hexagonal close-packed (hcp) structure, a material containing Ru is preferably used, and in particular, a Ru element or a Ru alloy is preferable. As the Ru alloy, for example, a Ru alloy oxide, such as Ru—$SiO_2$, Ru—$TiO_2$, or Ru—$ZrO_2$, may be mentioned. The content of Ru in the under layer 13 is, for example, 10 at % or more.

The thickness of the under layer 13 is, for example, in a range of 3.0 to 80.0 nm, preferably in a range of 5.0 to 50.0 nm, and even more preferably in a range of 10.0 to 50.0 nm. When the thickness of the under layer 13 is less than 5.0 nm, a coercive force Hc is remarkably decreased, and the function as the recording medium may be difficult to obtain. On the other hand, when the thickness of the under layer 13 is 50.0 nm or less, by the use of a substrate 11 having a Young's modulus of 6,250 N/mm² or more, a crack-resistant load of 200 [g/12.75 mm] or more can be obtained. In addition, when the crack-resistant load is less than 200 [g/12.75 mm], at the stage on which a manufacturer forms a data cartridge using the magnetic recording medium, or at the stage on which a user uses the data cartridge thus formed, a crack is liable to be generated. When a crack is generated as described above, the durability and the reliability of the magnetic recording medium are degraded as described above. The thickness of the under layer 13 may be measured using a cross-sectional transmission electron microscope (TEM) image of the magnetic recording medium taken by a TEM.
(Magnetic Recording Layer)

The magnetic recording layer 14 is a perpendicular recording layer in which a magnetic recording material is oriented in a perpendicular direction. In order to improve the recording density, the magnetic recording layer 14 is preferably a granular magnetic layer containing a Co-based alloy. This granular magnetic layer is formed of ferromagnetic crystalline grains containing a Co-based alloy and non-magnetic grain boundaries (non-magnetic material) surrounding the ferromagnetic crystalline grains. In more particular, this granular magnetic layer is formed of columns (columnar crystals) containing a Co-based alloy and non-magnetic grain boundaries (oxides such as $SiO_2$) which surround those columns and magnetically separate the columns from each other. By this structure, the magnetic recording layer 14 can be formed so that the columns are magnetically separated from each other. The content of Co of the magnetic recording layer 14 is, for example, 10 at % or more.

The Co-based alloy has a hexagonal close-packed (hcp) structure, and the c axis thereof is oriented in a perpendicular direction (film thickness direction) to the film surface. As the Co-based alloy, a CoCrPt-based alloy containing at least Co, Cr, and Pt is preferably used. The CoCrPt-based alloy is not particularly limited, and the CoCrPt-based alloy may further contain another additive element. As the additive element, for example, at least one element selected from the group consisting of Ni and Ta may be mentioned.

The non-magnetic grain boundary surrounding the ferromagnetic crystalline grain contains a non-magnetic metal material. In this embodiment, the metal includes a half metal. As the non-magnetic metal material, for example, either a metal oxide or a metal nitride may be used, and in order to more stably maintain the granular structure, a metal oxide is preferably used. As the metal oxide, for example, a metal oxide containing at least one element selected from the group consisting of Si, Cr, Co, Al, Ti, Ta, Zr, Ce, Y, and Hf may be mentioned, and a metal oxide including at least a Si oxide (that is, $SiO_2$) is preferable. As particular examples of the metal oxide, for example, $SiO_2$, $Cr_2O_3$, CoO, $Al_2O_3$, $TiO_2$, $Ta_2O_5$, $ZrO_2$, or $HfO_2$ may be mentioned. As the metal nitride, for example, a metal nitride containing at least one element selected from the group consisting of Si, Cr, Co, Al, Ti, Ta, Zr, Ce, Y, and Hf may be mentioned. As particular examples of the metal nitride, for example, SiN, TiN, and AlN may be mentioned. In order to more stably maintain the granular structure, of the metal nitride and the metal oxide, the non-magnetic grain boundary preferably contains the metal oxide.

In order to realize further improvement in signal-noise ratio (SNR), the CoCrPt-based alloy contained in the ferromagnetic crystal grain and the Si oxide contained in the non-magnetic grain boundary preferably have an average composition represented by the following formula (1). The reason for this is that since a saturated magnetization amount Ms is realized which suppresses the influence of a demagnetizing field and which can secure a sufficient reproduction output, a high SNR can be secured.

$$(Co_xPt_yCr_{100-x-y})_{100-z}-(SiO_2)_z \quad (1)$$

(In the formula (1), x, y, and z satisfy $69 \leq x \leq 72$, $12 \leq y \leq 16$, $9 \leq z \leq 12$, respectively.)

In addition, the above composition may be obtained as described below. After ion-beam etching is performed on the magnetic recording medium from a top coat layer 16 side, analysis by an Auger electron spectroscopy is performed on the outermost surface of the magnetic recording layer 14 thus etched, and the rate of the average atomic number with respect to the thickness is regarded as the rate of the element. In particular, the analysis is performed on five elements, Co, Pt, Cr, Si, and O, and the element amount on the percentage rate is identified.

Although the magnetic recording medium according to this embodiment is a single-layer magnetic recording medium having no lining layer (soft magnetic lining layer) containing a soft magnetic material, in this type of magnetic recording medium, when the influence of the demagnetizing field caused by the magnetic recording layer 14 is large in a perpendicular direction, sufficient recording in a perpendicular direction tends to be difficult to perform. Since the demagnetizing field is increased in proportion to the saturated magnetization amount Ms of the magnetic recording layer 14, in order to suppress the demagnetizing field, the saturated magnetization amount Ms is preferably decreased. However, when the saturated magnetization amount Ms is decreased, a residual magnetization amount Mr is decreased, and as a result, a reproduction output is decreased. Hence, a material contained in the magnetic recording layer 14 is preferably selected so that the influence of the demagnetizing field can be suppressed (that is, the saturated magnetization amount Ms is decreased), and at the same time, a residual magnetization amount Mr which can secure a sufficient reproduction output can be obtained. In the average composition of the above formula (1), those characteristics can both be satisfied, and a high SNR can be secured. The thickness of the magnetic recording layer 14 is, for example, in a range of 3.0 to 20.0 nm.

(Protective Layer)

The protective layer 15 contains, for example, a carbon material or silicon dioxide ($SiO_2$), and in view of the film strength of the protective layer 15, a carbon material is preferably contained. The content of the carbon material in the protective layer 15 is, for example, 10% or more. As the carbon material, for example, there may be mentioned graphite, diamond-like carbon (DLC), or diamond. The thickness of the protective layer 15 is, for example, in a range of 1.0 to 10.0 nm.

(Top Coat Layer)

The top coat layer 16 contains, for example, a lubricant agent. As the lubricant agent, for example, a silicone lubricant agent, a hydrocarbon lubricant agent, or a fluorinated hydrocarbon lubricant agent may be used.

[2. Structure of Sputtering Apparatus]

Figure 2:
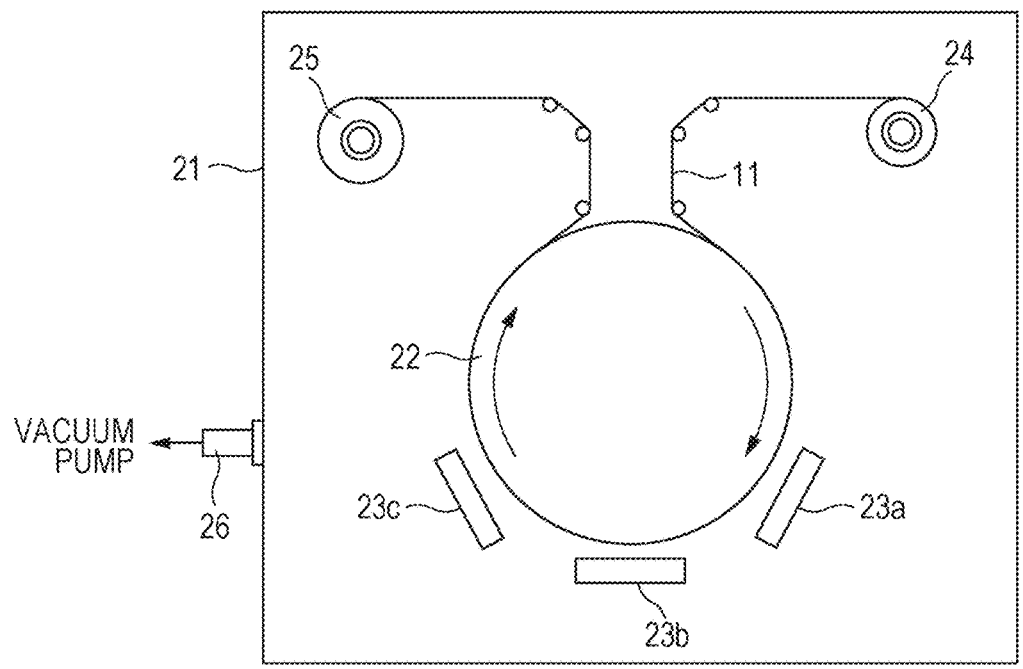
FIG. 2 is a schematic view showing one example of the structure of a sputtering apparatus used for manufacturing a magnetic recording medium according to an embodiment of the present technology.

FIG. 2 is a schematic view showing one example of the structure of a sputtering apparatus used for manufacturing a magnetic recording medium according to an embodiment of the present technology. This sputtering apparatus is a continuous winding type sputtering apparatus used for film formation of the seed layer 12, the under layer 13, and magnetic recording layer 14, and as shown in FIG. 2, the sputtering apparatus includes a film formation chamber 21, a drum 22, cathodes 23a to 23c, a feeding reel 24, and a winding reel 25. Although the sputtering apparatus is a DC (direct current) magnetron sputtering type apparatus, the sputtering method is not limited to this method.

The film formation chamber 21 is connected to a vacuum pump (not shown) via an exhaust port 26, and by this vacuum pump, the atmosphere inside the film formation chamber 21 is set to a predetermined degree of vacuum. Inside the film formation chamber 21, the rotatable drum 22, the feeding reel 24, and the winding reel 25 are disposed. In sputtering, the substrate 11 which is unwound out of the feeding reel 24 is wound by the winding reel 25 through the drum 22. The drum 22 is provided with a cooling mechanism (not shown) and is cooled, for example, to approximately −20° C. in sputtering. Inside the film formation chamber 21, the cathodes 23a to 23c are disposed to face the cylindrical surface of the drum 22. Targets are set to the respective cathodes 23a to 23c. In particular, the targets to form the seed layer 12, the under layer 13, and the magnetic recording layer 14 are set to the cathodes 23a, 23b, and 23c, respectively. By those cathodes 23a to 23c, a plurality of types of films, that is, the seed layer 12, the under layer 13, and the magnetic recording layer 14, are simultaneously formed.

The atmosphere of the film formation chamber 21 in sputtering is set, for example, to approximately $1 \times 10^{-5}$ to $5 \times 10^{-5}$ Pa. The film thickness and the characteristics (such as magnetic characteristics) of each of the seed layer 12, the under layer 13, and the magnetic recording layer 14 may be controlled, for example, by adjusting a tape line speed for winding the substrate 11, the pressure (sputtering gas pressure) of an Ar gas introduced in sputtering, and an input electric power.

[3. Method for Manufacturing Magnetic Recording Medium]

A magnetic recording medium according to an embodiment of the present technology may be formed, for example, as described below.

First, by the use of the sputtering apparatus shown in FIG. 2, the seed layer 12, the under layer 13, and the magnetic recording layer 14 are formed on the substrate 11. In particular, the film formation is performed as described below. First, the inside of the film formation chamber 21 is vacuumed to a predetermined pressure. Subsequently, while a process gas, such as an Ar gas, is introduced into the film formation chamber 21, the targets set to the cathodes 23a to 23c are sputtered, so that the seed layer 12, the under layer 13, and the magnetic recording layer 14 are sequentially formed on the surface of the substrate 11.

Next, the protective layer 15 is formed on the surface of the magnetic recording layer 14. As a method for forming the protective layer 15, for example, a chemical vapor deposition (CVD) method or a physical vapor deposition (PVD) method may be used.

Next, for example, a lubricant agent is applied on the surface of the protective layer 15 to form the top coat layer 16. As a method for applying a lubricant agent, for example, various application methods, such as gravure coating and dip coating, may be used.

Accordingly, the magnetic recording medium shown in FIG. 1 is obtained.

[4. Effects]

In the magnetic recording medium according to an embodiment, the amorphous seed layer 12, the under layer 13 containing Ru, and the magnetic recording layer 14 having a granular structure are laminated on the surface of the flexible substrate 11. In addition, in this laminate structure, the thickness of the under layer is set to 50.0 nm or less. Hence, when a tensile stress or a load is applied to the magnetic recording medium, or when the magnetic recording medium is bent, the crack generation in the laminate film on the surface of the substrate 11 can be suppressed. Hence, the reliability of the magnetic recording medium as a finished product can be improved. In addition, since the thickness of the under layer 13 is set to 5.0 nm or more, the magnetic characteristics can be improved.

When the amorphous seed layer 12 including an alloy containing Ti and Cr is provided between the substrate 11 and the under layer 13, the influence of an $O_2$ gas, $H_2O$, and the like, which are adsorbed to the substrate 11, on the under layer 13 can be suppressed. In addition, by the formation of a smooth metal surface on the surface of the substrate 11, the orientation of the under layer 13 and that of the magnetic recording layer 14 can be improved. Hence, superior magnetic characteristics are achieved, and improvement in performance of the medium, such as increase in output and reduction in noise, can be realized.

When the rate of O with respect to the total amount of Ti, Cr, and O contained in the seed layer 12 is set to 15 at % or less, and when the rate of Ti with respect to the total amount of Ti and Cr contained in the seed layer 12 is set in a range of 30 to 100 at %, further improvement in magnetic characteristics can be achieved.

EXAMPLES

Hereinafter, although the present technology will be describe in detail with reference to examples, the present technology is not limited to those examples.

(Young's Modulus)

In this example, the Young's modulus of a high molecular weight film used as a non-magnetic substrate was measured as described below. First, from a high molecular weight film, a test piece having a width of 10 mm and a length of 50 mm was obtained by cutting. Next, the Young's modulus of this test piece was measured by a Tensilon tensile tester at a tensile rate of 20 mm/min and at a room temperature of 25° C.

(Film Thickness)

In this example, the thickness of each layer laminated on the non-magnetic substrate was measured as described below. First, a magnetic tape was cut in a direction perpendicular to its primary surface, and the cross-section thereof is photographed by a TEM. Next, from a TEM image thus photographed, the thickness of each layer was obtained.

Examples 1-1 to 1-4, and Comparative Example 1-1

(Step of Forming Seed Layer)

First, after a high molecular weight film having a Young's modulus of 6,250 N/mm² was prepared as the flexible non-magnetic substrate, a TiCr seed layer having a thickness of 5.0 nm was formed on this film under the following film formation conditions.

Sputtering method: DC magnetron sputtering method
Target: $Ti_{50}Cr_{50}$ target
Ultimate vacuum: $1 \times 10^{-5}$ Pa
Gas species: Ar
Gas pressure: 0.5 Pa (Step of Forming Under Layer)

Next, under the following film formation conditions, a Ru under layer was formed on the TiCr seed layer to have a thickness in a range of 5.0 to 55.0 nm.

Sputtering method: DC magnetron sputtering method
Target: Ru target
Gas species: Ar
Gas pressure: 1.5 Pa (Step of Forming Magnetic Recording Layer)

Next, under the following film formation conditions, a (CoCrPt)—(SiO₂) magnetic recording layer having a thickness of 20.0 nm was formed on the Ru under layer.

Sputtering method: DC magnetron sputtering method
Target: $(Co_{75}Cr_{10}Pt_{15})_{90}$—$(SiO_2)_{10}$ target
Gas species: Ar
Gas pressure: 1.5 Pa (Step of Forming Protective Layer)

Next, under the following film formation conditions, a protective layer having a thickness of 5.0 nm was formed from carbon on the (CoCrPt)—(SiO₂) magnetic recording layer.

Sputtering method: DC magnetron sputtering method
Target: carbon target
Gas species: Ar
Gas pressure: 1.5 Pa (Step of Forming Top Coat Layer)

Next, a fluorinated lubricant agent was applied on the protective layer to form a top coat layer on the protective layer. Accordingly, a magnetic tape functioning as a perpendicular magnetic recording medium was obtained.

Examples 2-1 to 2-4, and Comparative Example 2-1

Except that as the flexible non-magnetic substrate, a high molecular weight film having a Young's modulus of 6,680 N/mm² was used, a magnetic tape was obtained in a manner similar to that of each of Examples 1-1 to 1-4 and Comparative Example 1-1.

Examples 3-1 to 3-5

Except that as the flexible non-magnetic substrate, a high molecular weight film having a Young's modulus of 16,000 N/mm² was used, a magnetic tape was obtained in a manner similar to that of each of Examples 1-1 to 1-4 and Comparative Example 1-1.

Comparative Example 3

Except that the amorphous TiCr seed layer was not formed between the non-magnetic substrate and the Ru under layer, a magnetic tape was obtained in a manner similar to that of Example 1-1.

Comparative Example 4

Except that a TiCr seed layer having a crystalline state was formed between the non-magnetic substrate and the Ru under layer, a magnetic tape was obtained in a manner similar to that of Example 1-1.

(Evaluation of Characteristics)

The following valuations (a) to (d) were performed on the magnetic tape obtained in each of Examples 1-1 to 1-4, Comparative Example 1-1, Examples 2-1 to 2-4, Comparative Example 2-1, and Examples 3-1 to 3-5. In addition, the following evaluations (c) and (d) were performed on the magnetic tape obtained in each of Comparative Examples 3 and 4.

(a) Crack-Resistant Load

Figure 3:
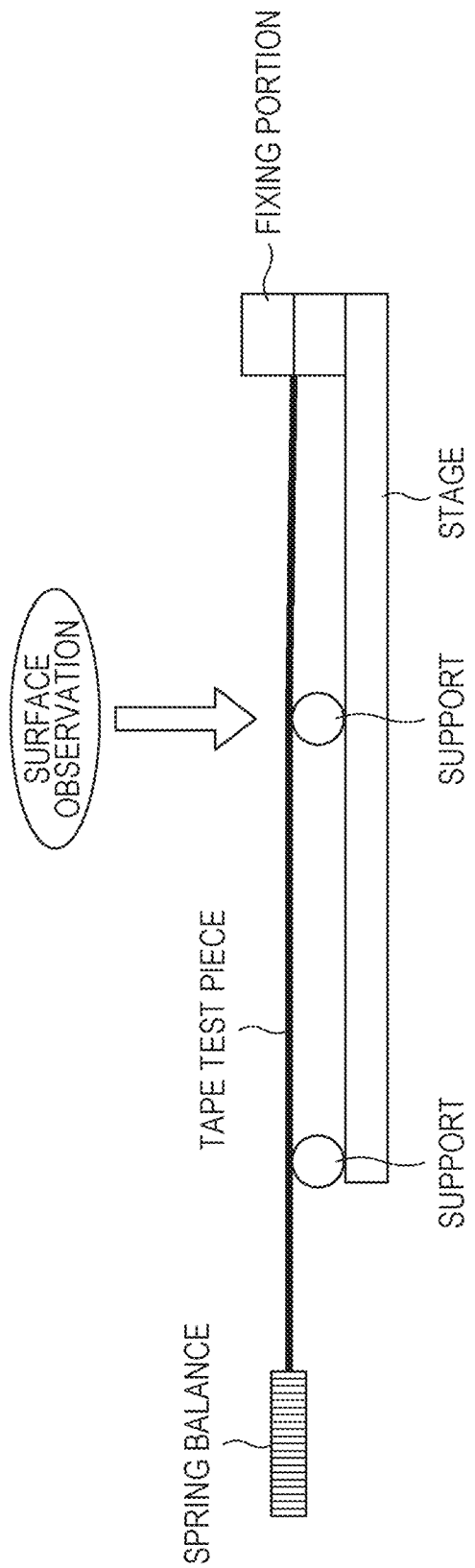
FIG. 3 is a schematic view illustrating a method for evaluating a crack-resistant load.
Figure 4A:
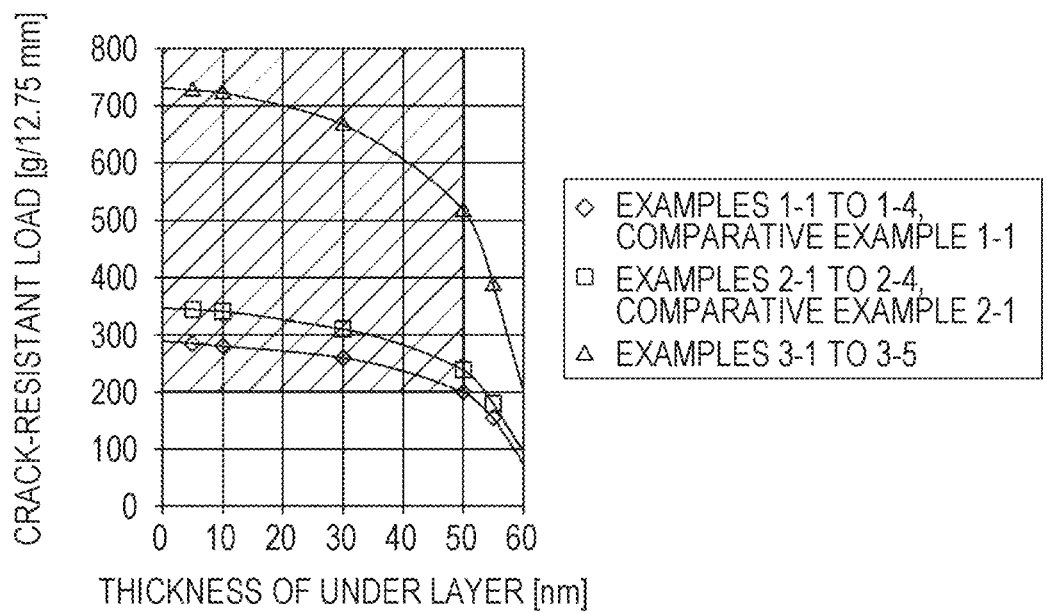
FIG. 4A is a graph showing an evaluation result of an under-layer thickness dependence of crack-resistant load of a magnetic tape of each of Examples 1-1 to 1-4, Comparative Example 1-1, Examples 2-1 to 2-4, Comparative Example 2-1, and Examples 3-1 to 3-5.

With reference to FIG. 3, a method for evaluating the crack-resistant load will be described. First, a test piece having a width of 12.75 mm and a length of 500 mm was obtained from the magnetic tape by cutting, and one end of this test piece in a longitudinal direction was fixed to a fixing portion of a stage. Next, after the other end of the test piece in a longitudinal direction was bound to a spring balance (push-pull gauge), a load was applied to the test piece by pulling the spring balance in a predetermined direction, and the surface of the magnetic tape was observed by an optical microscope. In addition, when a crack started to be generated at the stage on which the load was increased, the tensile load at this stage was read by the scale of the spring balance, and this value was defined as the "crack-resistant load". The results are shown in Table 1 and FIG. 4A. In this case, the "crack-resistant load" indicates a tensile load at which a crack starts to be generated. In addition, this evaluation was performed to estimate, when a magnetic tape is set to a recording and reproducing apparatus, such as a drive, whether or not the magnetic tape is able to withstand a tensile stress applied by a mechanism which drives the magnetic tape.

(b) Coercive Force Hc in Perpendicular Direction

Figure 4B:
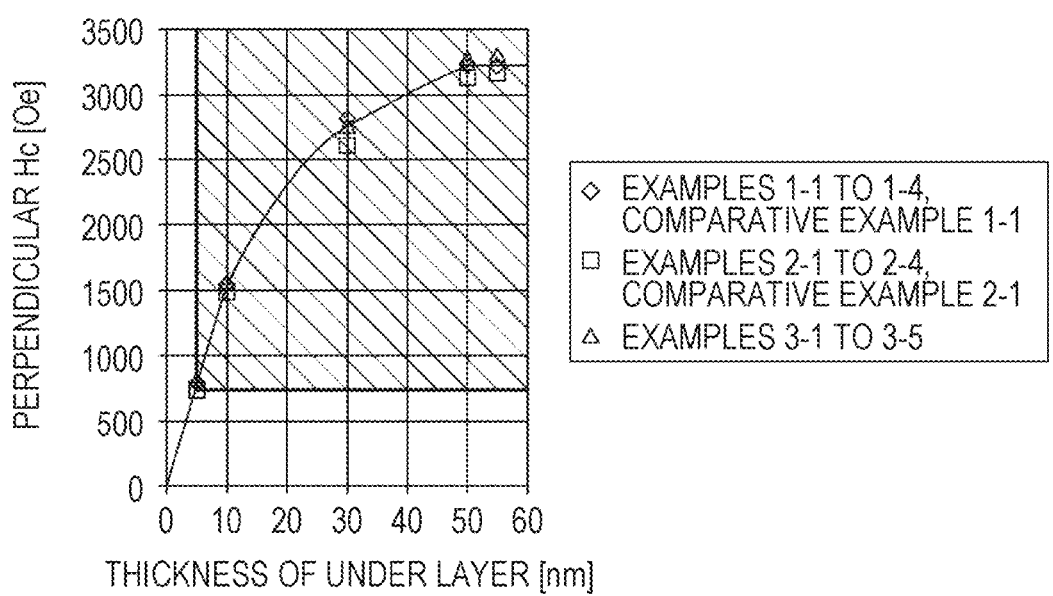
FIG. 4B is a graph showing an evaluation result of an under-layer thickness dependence of coercive force Hc in a direction perpendicular to a magnetic tape of each of Examples 1-1 to 1-4, Comparative Example 1-1, Examples 2-1 to 2-4, Comparative Example 2-1, and Examples 3-1 to 3-5.

A coercive force Hc of the magnetic recording layer in a perpendicular direction thereof was measured using a vibrating sample magnetometer (VSM). The results are shown in Table 1 and FIG. 4B.

(c) Perpendicular Orientation of Under Layer

First, θ/2θ characteristics were investigated by an x-ray diffraction apparatus, and the perpendicular orientation of Ru contained in the under layer was evaluated based on the following criteria. The results are shown in Table 1.

Good perpendicular orientation: only the peek of (0002) is observed.

Bad perpendicular orientation: besides the peak of (0002), peaks of (10-10) and (10-11) were observed.

In the above criteria, "-1" in the above crystalline orientation indicates "1" with an overline provided thereon (d) State of Seed Layer By an electron diffraction method, the state of the TiCr seed layer was analyzed. The results are shown in Table 1. In addition, in the electron diffraction method, when the TiCr seed layer is in a crystalline state, dots are obtained as an electron diffraction image, when the TiCr seed layer is in a polycrystalline state, rings are obtained as an electron diffraction image, and when the TiCr seed layer is in an amorphous state, a halo is obtained as an electron diffraction image.

Table 1 shows the structure of the magnetic tape and the evaluation results of each of Examples 1-1 to 1-4 and Comparative Example 1-1.

TABLE 1

|  | Example 1-1 | Example 1-2 | Example 1-3 | Example 1-4 | Comparative Example 1-1 |
|---|---|---|---|---|---|
| Young's Modulus of Substrate [N/mm$^2$] |  |  | 6250 |  |  |
| Thickness of Under Layer [nm] | 5.0 | 10.0 | 30.0 | 50.0 | 55.0 |
| Crystalline State of Seed Layer | Amorphous | Amorphous | Amorphous | Amorphous | Amorphous |
| Orientation State of Under Layer | Good | Good | Good | Good | Good |
| Crack-Resistant Load [g] | 285 | 280 | 260 | 200 | 155 |
| Perpendicular Hc [Oe] | 800 | 1500 | 2800 | 3200 | 3240 |

Table 2 shows the structure of the magnetic tape and the evaluation results of each of Examples 2-1 to 2-4 and Comparative Example 2-1.

TABLE 2

|  | Example 2-1 | Example 2-2 | Example 2-3 | Example 2-4 | Comparative Example 2-1 |
|---|---|---|---|---|---|
| Young's Modulus of Substrate [N/mm$^2$] |  |  | 6680 |  |  |
| Thickness of Under Layer [nm] | 5.0 | 10.0 | 30.0 | 50.0 | 55.0 |
| Crystalline State of Seed Layer | Amorphous | Amorphous | Amorphous | Amorphous | Amorphous |
| Orientation State of Under Layer | Good | Good | Good | Good | Good |
| Crack-Resistant Load [g] | 345 | 340 | 310 | 240 | 180 |
| Perpendicular Hc [Oe] | 750 | 1480 | 2600 | 3120 | 3150 |

Table 3 shows the structure of the magnetic tape and the evaluation results of each of Examples 3-1 to 3-5.

TABLE 3

|  | Example 3-1 | Example 3-2 | Example 3-3 | Example 3-4 | Example 3-5 |
|---|---|---|---|---|---|
| Young's Modulus of Substrate [N/mm$^2$] |  |  | 16000 |  |  |
| Thickness of Under Layer [nm] | 5.0 | 10.0 | 30.0 | 50.0 | 55.0 |
| Crystalline State of Seed Layer | Amorphous | Amorphous | Amorphous | Amorphous | Amorphous |
| Orientation State of Under Layer | Good | Good | Good | Good | Good |
| Crack-Resistant Load [g] | 730 | 725 | 670 | 520 | 390 |
| Perpendicular Hc [Oe] | 810 | 1550 | 2760 | 3280 | 3300 |

Table 4 shows the structure of the magnetic tape and the evaluation results of each of Comparative Examples 3 and 4.

TABLE 4

|  | Comparative Example 3 | Comparative Example 4 |
|---|---|---|
| Young's Modulus of Substrate [N/mm$^2$] | 6250 | |
| Thickness of Under Layer [nm] | 5.0 | 5.0 |
| Crystalline State of Seed Layer | — | Crystalline |
| Orientation State of Under Layer | Bad | Bad |
| Crack-Resistant Load [g] | — | — |
| Perpendicular Hc [Oe] | — | — |

<RE: Under-Layer Thickness Dependence of Crack-Resistant Load (See FIG. 4A)>

Regardless of the Young's modulus of the high molecular weight film, as the thickness of the under layer is increased, the crack-resistant load tends to decrease. In particular, when the thickness of the under layer is in a range of 5.0 to 50.0 nm, as the thickness of the under layer is increased, the crack-resistant load tends to gradually decrease. On the other hand, when the thickness of the under layer is in a range of 50.0 to 55.5 nm, as the thickness of the under layer is increased, the crack-resistant load tends to remarkably decrease. In particular, this remarkable decrease tendency is significant for a magnetic tape using a high molecular weight film having a highest Young's modulus (Young's modulus: 16,000 N/mm$^2$).

In the case of a magnetic tape using a high molecular weight film having a lowest Young's modulus (Young's modulus: 6,250 N/mm$^2$), when the thickness of the under layer is more than 50 nm, the crack-resistant load tends to decrease to less than 200 [g/12.75 mm]. In addition, when the crack-resistant load is less than 200 [g/12.75 mm], as described above, at the stage of forming a data cartridge, or at the stage of using the data cartridge thus formed, a crack is liable to be generated.

Hence, in the case of using a high molecular weight film having a Young's modulus of 6,250 N/mm$^2$ or more as the non-magnetic substrate, in order to obtain a crack-resistant load of 200 [g/12.75 mm] or more, the thickness of the under layer is preferably set to 50 nm or less.

In the case of using a high molecular weight film having a Young's modulus of 16,000 N/mm$^2$, as compared to the case of using a high molecular weight film having a Young's modulus of 6,250 or 6,680 N/mm$^2$, the crack-resistant load is increased when the thickness of the under layer is not changed between the cases described above. However, since a high molecular weight film having a Young's modulus of 16,000 N/mm$^2$ is expensive, when this high molecular weight film is used as the substrate, the manufacturing cost thereof is unfavorably increased.

Accordingly, in order to reduce the manufacturing cost, a high molecular weight film having a Young's modulus of approximately 6,250 or 6,680 N/mm$^2$ is preferably used as the non-magnetic substrate. In addition, in view of the reduction in manufacturing cost, a usable high molecular weight film is not limited to the above high molecular weight film, but any film having a Young's modulus in a range of 6,250 to 7,000 N/mm$^2$ may also be used in view of the reduction in manufacturing cost.

<RE: Under-Layer Thickness Dependence of Coercive Force Hc in Perpendicular Direction (See FIG. 4B)>

Regardless of the Young's modulus of the high molecular weight film, as the thickness of the under layer is increased, the coercive force Hc in a perpendicular direction tends to increase. In particular, when the thickness of the under layer is in a range of 5.0 to 50.0 nm, as the thickness of the under layer is increased, the coercive force Hc tends to remarkably increase. On the other hand, when the thickness of the under layer is in a range of 50.0 to 55.5 nm, as the thickness of the under layer is increased, the coercive force Hc tends to gradually increase.

In the case of a magnetic tape using a high molecular weight film (Young's modulus: 6,680 N/mm$^2$), when the thickness of the under layer is less than 5.0 nm, the coercive force Hc tends to remarkably decrease to less than 750 Oe. When the coercive force Hc remarkably decreases as described above, a written recording signal may not be maintained, and as a result, the magnetic tape may not function as a recording medium.

In consideration of the above evaluation results in combination, when a high molecular weight film having a Young's modulus of 6,250 N/mm$^2$ or more is used as the substrate, the thickness of the under layer is preferably in a range of 5.0 to 50.0 nm.

<RE: Orientation State of Under Layer>

In the above Examples 1-1 to 1-4, Comparative Example 1-1, Examples 2-1 to 2-4, Comparative Example 2-1, and Examples 3-1 to 3-5, according to the result of the investigation of the perpendicular orientation of the Ru under layer, the peaks of (10-10) and (10-11) were not observed, and there was observed only the peak of (0002) indicating that the c axis of the hexagonal close-packed (hcp) structure was oriented in a perpendicular direction. Accordingly, it was found that when the amorphous TiCr seed layer is provided between the non-magnetic substrate and the Ru under layer, the perpendicular orientation of the Ru under layer is significantly improved.

In Comparative Example 3, according to the result of the investigation of the perpendicular orientation of the Ru under layer, the peak of (0002) of the hexagonal close-packed (hcp) structure showing the perpendicular orientation was low, and besides this peak, the peaks of (10-10) and (10-11) were also observed. Accordingly, it was found that when the amorphous TiCr seed layer is not provided between the non-magnetic substrate and the Ru under layer, the crystalline orientation of the Ru under layer becomes random, and a sufficient perpendicular orientation is be obtained.

In Comparative Example 4, according to the result of the investigation of the perpendicular orientation of the Ru under layer, besides the peak of (0002) of the hexagonal close-packed (hcp) structure showing the perpendicular orientation, the peaks of (10-10) and (10-11) were also observed as in the case of Comparative Example 3. Accordingly, it was found that when the crystalline TiCr seed layer is provided between the non-magnetic substrate and the Ru under layer, a sufficient perpendicular orientation is not obtained.

Heretofore, although the embodiments of the present technology have been particularly described, the present technology is not limited to the above embodiments and may be variously changed and modified without departing from the scope of the present technology.

For example, the structure, the method, the step, the shape, the material, the numeral, and the like disclosed in the above embodiments have been described by way of example, and as occasion calls, a structure, a method, a step, a shape, a material, a numeral, and the like, each of which is different from that described above, may also be used.

In addition, the structure, the method, the step, the shape, the material, the numeral, and the like of the embodiments described above may be used in combination as long as without departing from the scope of the present technology.

In addition, the "comprise (or comprising)" used in this disclosure also includes "consisting essentially of" and "consisting of", each of which is a more restrictive term.

In addition, in the above embodiments, although the seed layer having a single-layer structure has been described by way of example, the seed layer may have a double-layer structure including a first seed layer and a second seed layer. In this case, the first seed layer is provided at an under layer side, and the second seed layer is provided at a substrate side. As the first seed layer, a seed layer similar to that in the above one embodiment may be used. The second seed layer contains, for example, a material having a composition different from that of the first seed layer. As particular examples of this material, NiW, Ta, or the like may be mentioned. When the magnetic recording medium includes a seed layer having a double-layer structure as described above, the orientation of the under layer and that of the magnetic recording layer can be further improved, and hence, the magnetic characteristics can be further improved. In addition, the seed layer may have a multilayer structure including at least three layers.

In addition, in the above embodiments, although the under layer having a single-layer structure is described by way of example, the under layer may have a double-layer structure including a first under layer and a second under layer. In this case, the first under layer is provided at a magnetic recording layer side, and the second under layer is provided at a seed layer side. The thickness of the first under layer is preferably larger than that of the second under layer. The reason for this is that the characteristics of the magnetic recording medium can be improved. In addition, the under layer may have a multilayer structure including at least three layers.

In addition, the present technology may also employ the following structures.

(1) A magnetic recording medium comprising a flexible substrate; an amorphous seed layer; an under layer containing Ru; and a recording layer having a granular structure, wherein the seed layer is provided between the substrate and the under layer, and the under layer has a thickness in a range of 5 to 50 nm.

(2) The magnetic recording medium according to the above (1), wherein the seed layer includes an alloy containing Ti and Cr.

(3) The magnetic recording medium according to the above (1) or (2), wherein the seed layer reduces surface irregularities of the substrate.

(4) The magnetic recording medium according to one of the above (1) to (3), wherein the substrate has a Young's modulus in a range of 6,250 to 16,000 N/mm².

(5) The magnetic recording medium according to one of the above (1) to (3), wherein the substrate has a Young's modulus in a range of 6,250 to 7,000 N/mm².

(6) The magnetic recording medium according to one of the above (1) to (5), wherein the substrate has a thickness of 10.0 μm or less.

(7) The magnetic recording medium according to one of the above (1) to (6), wherein the magnetic recording medium has a crack-resistant load in a range of 200 to 500 [g/12.75 mm].

(8) The magnetic recording medium according to one of the above (1) to (7), wherein the recording layer has a granular structure in which grains containing Co, Pt, and Cr are separated by oxides.

(9) The magnetic recording medium according to the above (8), wherein the recording layer has an average composition represented by the following formula (1).

$$(Co_xPt_yCr_{100-x-y})_{100-z}\text{-}(SiO_2)_z \qquad (1)$$

(In the formula (1), x, y, and z satisfy $69 \leq x \leq 72$, $12 \leq y \leq 16$, $9 \leq z \leq 12$, respectively.)

It should be understood by those skilled in the art that various modifications, combinations, sub-combinations and alterations may occur depending on design requirements and other factors insofar as they are within the scope of the appended claims or the equivalents thereof.

What is claimed is:

1. A magnetic tape comprising:
   a flexible substrate;
   an amorphous seed layer comprising an alloy comprising Ti and Cr;
   an under layer containing Ru; and
   a recording layer having a granular structure,
   wherein the seed layer is provided between the substrate and the under layer, the under layer has a thickness in a range of 5 to 50 nm, and the substrate has a Young's modulus in a range of 6,250 to 16,000 N/mm²; and
   wherein the magnetic tape has a crack-resistant load in a range of 200 to 500 g/12.75 mm.

2. The magnetic tape of claim 1, wherein the seed layer reduces surface irregularities of the substrate.

3. The magnetic tape of claim 1, wherein the substrate has a Young's modulus in a range of 6,250 to 7,000 N/mm².

4. The magnetic tape of claim 1, wherein the substrate has a thickness of 10.0 μm or less.

5. The magnetic tape of claim 1, wherein the recording layer has a granular structure in which grains containing Co, Pt, and Cr are separated by oxides.

6. The magnetic tape of claim 5, wherein the recording layer has an average composition represented by the following formula (1):

$$(Co_xPt_yCr_{100-x-y})_{100-z}\text{-}(SiO_2)_z \qquad (1)$$

wherein, in the formula (1), x, y, and z satisfy $69 \leq x \leq 72$, $12 \leq y \leq 16$, $9 \leq z \leq 12$, respectively.

7. The magnetic tape of claim 1, wherein an amount of Ru in the under layer is at least about 10 at %.

8. The magnetic tape of claim 1, wherein the seed layer comprises an amount of Ti in a range of 30 to less than 100 at % based on a total amount of Ti and Cr contained in the seed layer.

9. The magnetic tape of claim 1 further comprising a soft magnetic lining layer.

10. The magnetic tape of claim 1, wherein the surface recording density of the tape is at least 50 GB/in².

11. A data cartridge comprising the magnetic tape of claim 1.

12. The data cartridge of claim 11, wherein the data cartridge has a capacity recording of at least 50 TB.

* * * * *